(12) United States Patent
Jager

(10) Patent No.: US 6,892,231 B2
(45) Date of Patent: May 10, 2005

(54) METHOD AND APPARATUS FOR VERIFYING THE CONTENTS OF A GLOBAL CONFIGURATION FILE

(75) Inventor: Marcus J. Jager, Boulder Creek, CA (US)

(73) Assignee: Microsoft Corporation, Redmond, WA (US)

(*) Notice: Subject to any disclaimer, the term of this patent is extended or adjusted under 35 U.S.C. 154(b) by 718 days.

(21) Appl. No.: 09/742,040

(22) Filed: Dec. 20, 2000

(65) Prior Publication Data

US 2002/0052937 A1 May 2, 2002

Related U.S. Application Data

(63) Continuation-in-part of application No. 09/704,625, filed on Nov. 2, 2000.

(51) Int. Cl.[7] ............................................. G06F 15/177
(52) U.S. Cl. ........................................ 709/220; 370/254
(58) Field of Search ................................ 709/217–229; 370/254–256; 717/176–178; 714/3, 4, 7, 48

(56) References Cited

U.S. PATENT DOCUMENTS

| | | | | |
|---|---|---|---|---|
| 6,598,057 B1 | * | 7/2003 | Synnestvedt et al. | 707/200 |
| 6,725,367 B2 | * | 4/2004 | Morrison et al. | 713/1 |
| 2002/0021675 A1 | * | 2/2002 | Feldmann | 370/254 |
| 2002/0103631 A1 | * | 8/2002 | Feldmann et al. | 703/22 |

OTHER PUBLICATIONS

Black et al., "Verifying Resilient Software," *Proceedings of the 30th Hawaiian International Conference on System Sciences*, 5:262–266, 1997.

Dilley et al., "Web Server Performance Measurement and Modeling Techniques," *Performance Evaluation*, 33(1):5–26, 1998.

(Continued)

*Primary Examiner*—Jeffrey Gaffin
*Assistant Examiner*—David Martinez
(74) *Attorney, Agent, or Firm*—Christensen O'Connor Johnson Kindness PLLC

(57) ABSTRACT

A method and apparatus are provided for determining the validity of a global configuration file. In order to verify the global configuration file, the configuration file is first "flattened." To flatten the configuration file, the rules in the first block of the configuration file are identified. A settings file is then created with the rules set as true. The normal configuration process is then performed on the configuration file. The resulting settings file constitute the flattened settings for the block and are associated with the block. A determination is then made as to whether any conflicting settings, inconsistently set related settings, or syntax errors exist within the flattened settings. If any such settings do exist, an error message is generated. This process is then repeated for each block in the configuration file so that flattened settings are created for each block. A testing block may also be utilized to identify problems with the settings file generate by the testing block. Reverse queries may also be performed on the settings file. Changes in the flattened configuration files caused by changes in the global configuration file can also be identified. The flattened files may also be used to simplify the server computer configuration process.

30 Claims, 12 Drawing Sheets

OTHER PUBLICATIONS

Gavish et al., "Configuration of Fully Replicated Distributed Database System Over Wide Area Networks," *Annals of Operations Research*, 36:167–191, 1992.

Kanodia et al., "Multi–Class Latency–Bounded Web Servers," *2000 International Workshop on Quality of Service*, pp. 231–239.

Kramer, "Knowledge–Based Configuration of Computer Systems Using Hierarchical Partial Choice," *Third International Conference, IEEE Computer Society*, Nov. 5–8, 1991, San Jose, CA, pp. 368–375.

Maryanski, "Data–Server Design Issues," *AFIPS Conference Proceedings, 1982 National Computer Conference*, 51:429–438, Jun. 7–10, 1982.

Mazingo, "Internet Server Load Balancing," *Digital Systems Report*, 21(2):27–29, 1999.

Schroeder et al., "Scalable Web Server Clustering Technologies," *IEEE Network*, 14(3):38–45, 2000.

* cited by examiner

METHOD AND APPARATUS FOR VERIFYING THE CONTENTS OF A GLOBAL CONFIGURATION FILE

CROSS-REFERENCE TO RELATED APPLICATIONS

This application is a continuation-in-part of U.S. patent application Ser. No. 09/704,625, filed Nov. 2, 2000, which is incorporated herein by reference, the benefit of the filing date of which is claimed under 35 U.S.C. §120.

FIELD OF THE INVENTION

This invention generally relates to the field of client/server computing devices and, more specifically, relates to a method and apparatus for verifying the contents of a global configuration file utilized to configure multiple server computers.

BACKGROUND OF THE INVENTION

Large-scale World Wide Web ("Web" or "WWW") sites typically utilize large clusters, or "farms," of Web servers to respond to incoming Web page requests. Because the volume of requests received at popular Web sites can be enormous, literally thousands of separate Web server computers may be utilized in such a Web server farm. When a request is received for a Web page available through the Web server farm, the request is assigned to one of the available Web server computers through the use of a load balancing device. By receiving Web page requests at a central location and then routing the request to an available Web server computer in this manner, a large volume of requests may be easily handled. However, while server farms configured in this manner can respond to a large number of Web page requests efficiently, the configuration and maintenance of thousands of Web server computers can be extremely time consuming and expensive.

One of the difficulties in configuring a large group of Web server computers arises from the fact that each server computer utilizes unique configuration files. For instance, the location of a particular server computer in the network may cause its configuration files to be different from the configuration files on other server computers located at other locations in the network. If a server computer is moved to a different location within the network, it may not function properly in its new location because the configuration files correspond to the previous location of the computer. Such a problem can be extremely difficult to diagnose when thousands of server computers are utilized.

Another difficulty that arises when a large-scale farm of Web servers is utilized occurs when it is necessary to "brand" the Web site for different business partners. Because the domain name to which a particular Web server responds is fixed in the configuration file, the Web server can only respond to requests from that specific domain. For instance, a Web server for providing Web-based e-mail services that is configured to receive requests for the "www.hotmail.com" domain can only respond to requests for that particular domain. If a business partner wanted to provide a branded Web-based e-mail service using the same functionality at another domain, an entirely separate Web server computer would have to be utilized to provide the branded Web site. Therefore, much of the capability of the Web server would have to be recreated for the branded Web site.

One solution to the above-described problems is to utilize a single configuration file to dynamically configure multiple server computers. When a request is received at any server computer, the server computer dynamically configures itself utilizing the contents of a global configuration file. The global configuration file contains configuration settings that may or may not be utilized by the server computer when configuring itself To determine if particular configuration settings should be utilized by the server computer when configuring itself, the server computer parses rules also contained in the global configuration file. If a rule is evaluated as true, configuration settings associated with the rule are used by the server computer when configuring itself The server computer can then respond to the request utilizing a dynamic configuration.

Using a common global configuration file to configure many server computers reduces the amount of time necessary to maintain each server because only a single configuration file is used. However, as the size of the global configuration file gets large, it becomes more and more difficult for system maintenance personnel to determine whether the global configuration file will correctly configure each server computer under different conditions. For instance, it may be difficult for maintenance personnel to determine whether a particular configuration file contains syntax errors, or whether the configuration file will generate conflicting settings or inconsistent related settings when utilized.

Therefore, in light of the above problems, there is a need for a method and system for verifying a global configuration file that can easily and quickly determine whether a configuration file is correct. Moreover, there is a need for a method and apparatus for verifying a global configuration file that can determine whether the configuration file will generate conflicting settings or inconsistently set related settings when utilized.

SUMMARY OF THE INVENTION

The present invention solves the above problems by providing a method and apparatus for verifying the contents of a global configuration file. Generally described, a method and apparatus are provided that can identify potential problems within a global configuration file, such as syntax errors, conflicting settings, and related settings that are set inconsistently.

In order to verify a global configuration file, the method and apparatus provided by the present invention "flattens" the configuration file. To flatten the configuration file, the rules in a first block of the configuration file are identified. A settings file is then created with the identified rules set as "true." The configuration process is then performed using the global configuration file and the settings file. The resulting settings file constitutes the "flattened" settings for the block and are associated with the block. The method and apparatus provided by the present invention then determines whether any conflicting settings exist within the flattened settings. If conflicting settings exist, an error message is generated. Likewise, an error message is generated if related settings are set inconsistently or if syntax errors are identified. This process is then repeated for each block in the global configuration file so that a flattened settings file is created corresponding to each block.

According to an embodiment of the present invention, a testing block may also be "flattened" to identify problems specific to the testing block. To check a testing block, the present invention first receives the testing block from a user or another source location. The testing block is then flattened. The settings file generated by the flattening process is then checked to determine if it contains any conflicting settings, to determine if it contains all required settings, to determine if all related settings are set consistently, and to determine if the syntax is correct. If any errors are found, an error message is generated identifying the errors.

According to another embodiment of the present invention, "reverse queries" may be performed on the settings file. That is, the present invention can identify the testing blocks that cause a particular value of a setting to occur. To accomplish this, the present invention creates a dummy setting within each flattened list identifying all of the blocks that triggered to create the flattened list of settings. The dummy setting may also indicate the particular blocks that generated a particular setting. The flattened lists may then be searched for a particular setting. Once the setting has been located, the particular blocks or series of blocks that caused the particular setting to be generated can be identified. This information may then be utilized to troubleshoot the configuration file.

According to yet another embodiment of the present invention, changes in the flattened configuration files caused by changes in the global configuration file can be identified. To provide such functionality, the present invention saves a set of flattened configuration files for a first global configuration file. Changes may then be made to the global configuration file. Once the changes have been made, the present invention will then generate a second set of flattened configuration files. The present invention then compares the first and second flattened configuration files to identify the differences between them. The differences may then be displayed and used to troubleshoot the global configuration file.

According to another embodiment of the present invention, the flattened files may be used to simplify the server computer configuration process. To accomplish this, the flattened files for the global configuration file are generated. Then, the flattened files are parsed with a list of static initial settings that never change, such as the server IP address. The blocks that are triggered during the parse are then deleted from the flattened files. When a request is received at the server computer, the settings file that is generated from the parse is then used as the initial settings file to parse the flattened files. Because a reduced number of flattened blocks is used, the configuration process is faster.

The present invention also provides a computer-controlled apparatus and a computer-readable medium for verifying the contents of a global configuration file.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

The present invention is directed to a method and apparatus for verifying the contents of a configuration file. The present invention may be embodied in an executable software component for providing the functionality described herein. Additionally, aspects of the present invention may be embodied in a Web server application program, such as Internet Information Server, provided by Microsoft® Corporation of Redmond, Wash.

Referring now to the figures, in which like numerals represent like elements, an actual embodiment of the present invention will be described. Although aspects of the invention will be described in the general context of an application program that executes on an operating system in conjunction with a server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. Although the invention is also described as being practiced in distributed computing environment, where tasks are performed by remote processing devices that are linked through a communications network, other possible implementations should be apparent to those skilled in the art.

Figure 1:
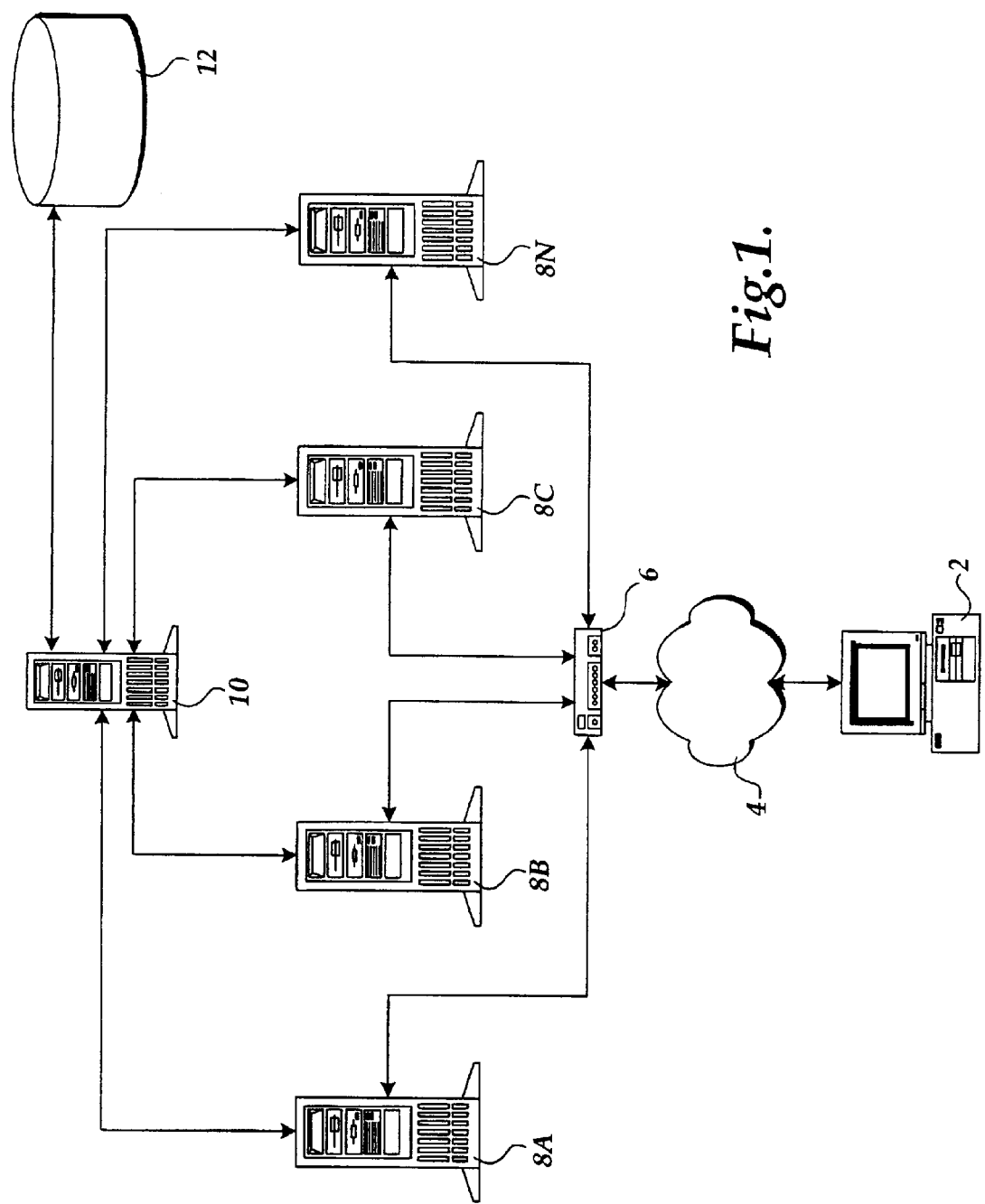
FIG. 1 is a block diagram illustrating an illustrative operating environment for an actual embodiment of the present invention.

Referring now to FIG. 1, an illustrative operating environment for an embodiment of the present invention will be described. Aspects of the present invention are implemented as an executable software component executing on a server computer, such as Web server computers 8A–8N, accessible via a distributed computing network, such as the Internet 4. As is well known to those skilled in the art, the Internet 4 comprises a collection of networks and routers that use the Transmission Control Protocol/Internet Protocol ("TCP/IP") to communicate with one another. The Internet typically includes a plurality of local area networks ("LANs") and wide area networks ("WANs") that are interconnected by routers. Routers are special purpose computers used to interface one LAN or WAN to another. Communication links within the LANs may be twisted wire pair, or coaxial cable, while communication links between networks may utilize 56 Kbps analog telephone lines, 1 Mbps digital T-1 lines, 45 Mbps T-3 lines or other communications links known to those skilled in the art. Furthermore, computers, such as client computer 2, and other related electronic devices can be remotely connected to either the LANs or the WANs via a permanent network connection or via a modem and temporary telephone link. It will be appreciated that the Internet 4 comprises a vast number of such interconnected networks, computers, and routers.

A client computer 2 capable of executing a Web browser application program (not shown), such as Microsoft® Internet Explorer, may be utilized to transmit a request for a Web page to one of the Web server computers 8A–8N. As is well known to those skilled in the art, the Web is a vast collection of interconnected or "hypertext" documents written in Hypertext Markup Language ("HTML"), or other markup languages, that are available from "Web sites" accessible through the Internet. A Web site is provided by a Web server computer, like Web server computers 8A–8N, connected to the Internet 4, that has mass storage facilities for storing such hypertext documents, and that executes administrative software for handling requests for the hypertext documents.

Large-scale Web sites are typically implemented utilizing a two-tier computer systems architecture as shown in FIG. 1. The first tier typically comprises one or more "front-end" Web server computers, like Web server computers 8A–8N, that receive and process live requests for Web pages from a client computer 2 connected to the Internet 4. As is well known to those skilled in the art, the first tier Web servers are frequently connected to the Internet 4 through a load balancing device 6, such as the Local Director™ from Cisco Systems®. The load balancing device 6 intercepts requests intended for one of the Web server computers 8A–8N, and forwards each request to a Web server computer that has computing resources available to respond to the request.

In addition to the Web server computers 8A–8C, a large-scale Web site may also include a "back-end" server computer 10 that stores user information, Web pages, graphics files, and other resources that may be served to client computer 2 by one of the Web server computers 8A–8N. The back-end server computer 10 may store this information in a database 12 that is located either local or remotely.

Figure 2:
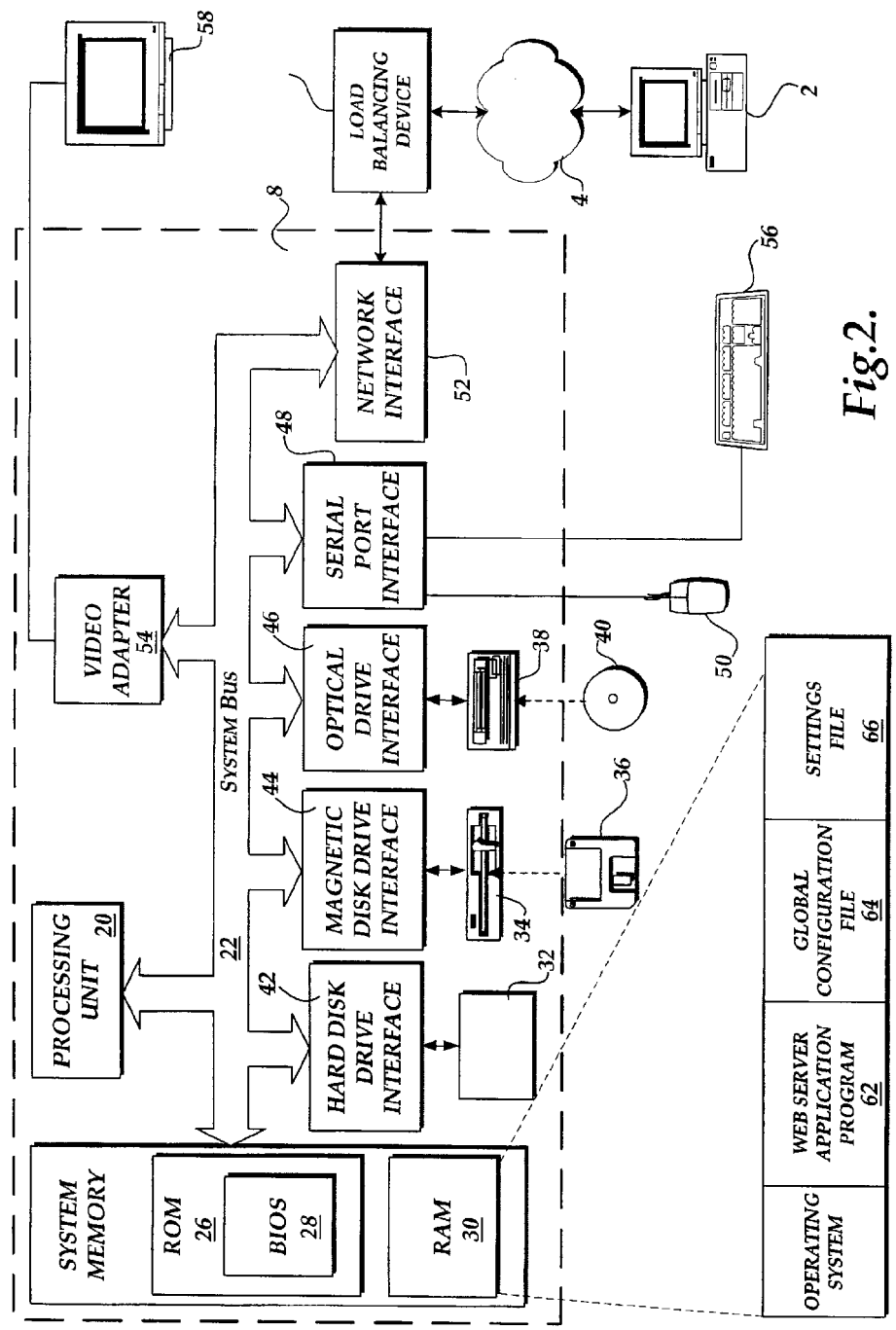
FIG. 2 is a block diagram illustrating a server computer utilized in an actual embodiment of the present invention.

Referring now to FIG. 2, an illustrative Web server computer 8 will be described. As mentioned briefly above, a communications session is initiated over the Internet 4 or other distributed computing network between the Web server computer 6 and a client computer 2. Typically, the communications session is initiated in response to a request for a resource, like a WWW page (not shown), located at the Web server computer 8. According to an embodiment of the present invention, the Web server computer 8 configures itself dynamically when the communications session is initiated with the client computer 2. An illustrative routine is described below with reference to FIG. 5 for receiving such requests and dynamically configuring the Web server computer 8.

The Web server computer 8 comprises a general purpose server computer for receiving and responding to Hypertext Transfer Protocol ("HTTP") requests as known to those skilled in the art. The Web server computer 8 comprises a conventional server computer, including a processing unit 20, a system memory 24, and a system bus 22 that couples the system memory 24 to the processing unit 20. The Web server computer 8 also typically includes at least some form of computer-readable media. Computer-readable media can be any available media that can be accessed by the Web server computer 8. By way of example, and not limitation, computer-readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory ("RAM"), read only memory ("ROM"), EPROM, EEPROM, flash memory or other solid-state memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by the Web server computer 8.

According to an embodiment of the present invention, the system memory 24 includes a ROM 26 and a RAM 30. A basic input/output system 28 ("BIOS"), containing the basic routines that help to transfer information between elements within the Web server computer 8, such as during start-up, is stored in ROM 26. The Web server computer 8 further includes a hard disk drive 32, a magnetic disk drive 34, e.g., to read from or write to a removable disk 36, and an optical disk drive 38, e.g., for reading a CD-ROM disk 40 or to read from or write to other optical media such as a DVD. The hard disk drive 32, magnetic disk drive 34, and optical disk drive 38 are connected to the system bus 22 by a hard disk drive interface 42, a magnetic disk drive interface 44, and an optical drive interface 46, respectively. The drives and their associated computer-readable media provide nonvolatile storage for the Web server computer 8.

A number of program modules may be stored in the drives and RAM 30, including an operating system 60 suitable for controlling the operation of a server computer, such as Windows NT® or Windows® 2000 from Microsoft®. Additionally, a Web server application program 62 may be stored in RAM 30, like Internet Information Server, also from Microsoft®. As known to those skilled in the art, the Web server application program 62 is operative to receive HTTP requests through the network interface 52 and to respond to those requests. Typically, an HTTP request will take the form of a request for a page encoded in HTML, a graphics file, or another application program stored at, or accessible to, the Web server computer 8. As will be described in more detail below, the Web server computer 8 may dynamically configure itself when a request is received utilizing a global configuration file 64 and a settings file 66. The format and contents of the global configuration file 64 and the settings file 66 are described below with respect to FIGS. 3A and 3B, respectively. The operation of the Web server computer 8 is described in more detail below with reference to FIGS. 5–12.

A user may control the operation of the Web server computer 8 through input devices such as a keyboard 56 or a mouse 50. These and other input devices are often connected to the processing unit 20 through a serial port interface 48 that is coupled to the system bus 22, but may be connected by other interfaces, such as a universal serial bus ("USB"). A monitor 58 or other type of display device is also connected to the system bus 22 via an interface, such as a video adapter 54. In addition to the monitor, a Web server computer 8 may include other peripheral output devices, such as a printer (not shown).

As described above with respect to FIG. 1, the Web server computer 8 operates in a networked environment. According to an embodiment of the invention, the Web server computer 8 communicates with the client computer 2 over the Internet 4. The Web server computer 8 connects to the Internet 4 through a network interface 52. Alternatively, the Web server computer 8 may include a modem (not shown) and use an Internet Service Provider ("ISP") to establish a connection to the Internet 4. Additionally, a load balancing device 6 may be provided to direct network traffic to the Web server computer 8. It will be appreciated that the network connections shown are illustrative and other means of establishing a communications link between the Web server computer 8 and the Internet 4 may be used.

Figure 3:
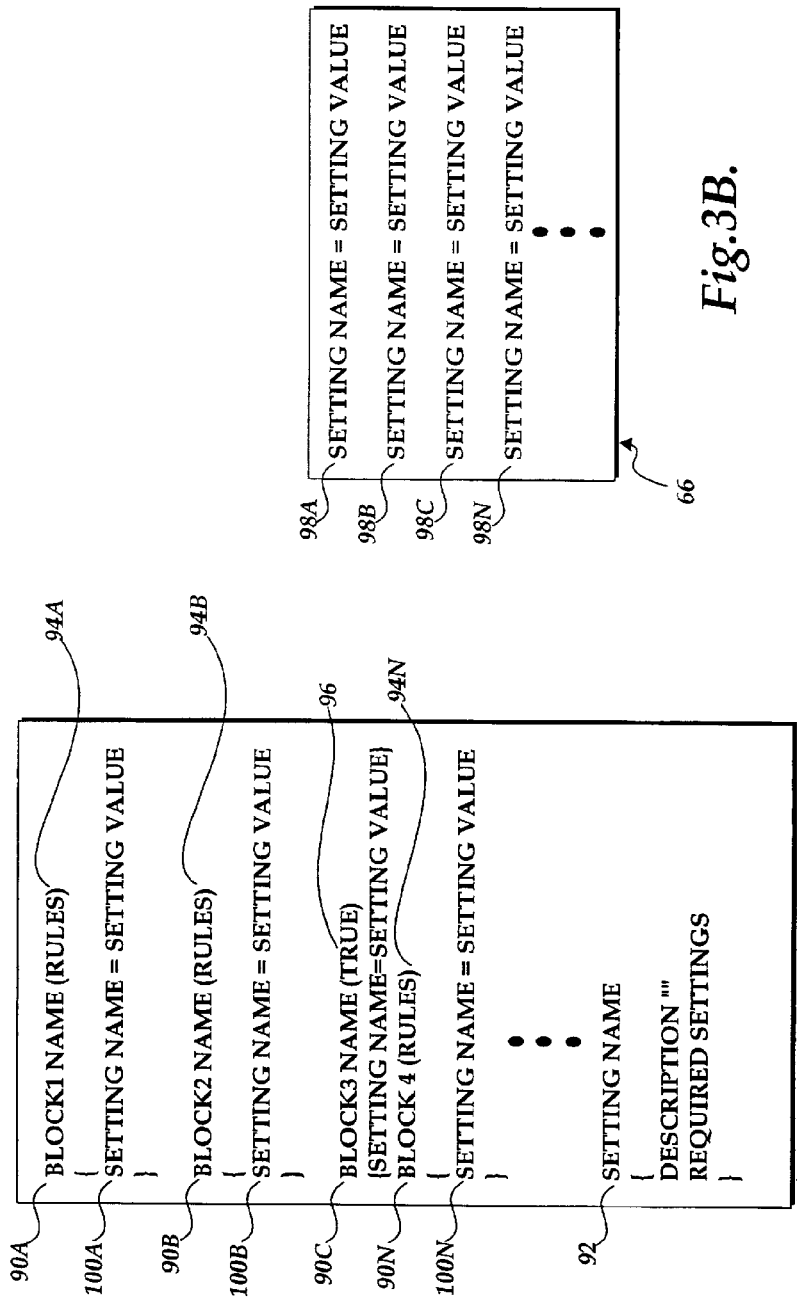
FIG. 3A is a block diagram illustrating the data structure format of a global configuration file utilized by a server computer in an actual embodiment of the present invention.
FIG. 3B is a block diagram illustrating the data structure format of a settings file utilized by a server computer in an actual embodiment of the present invention.

Referring now to FIG. 3A, a data structure for a global configuration file 64 utilized in an embodiment of the present invention will be described. The global configuration file 64 comprises a plurality of blocks 90A–90N. Each block is identified by a unique name and may include an associated rule 94A–94N. A rule 94A–94N comprises a Boolean expression that may be evaluated as true or false depending upon the values of the configuration settings or other variables contained in the rule. Each block 90A–90N may also have one or more associated configuration settings 100A–100N. Configuration settings 100A–100N comprise a setting name and a corresponding value that corresponds to an actual configuration parameter within the Web server computer. As will be described in greater detail below, the rule associated with each block is evaluated by the Web server computer 8 using the contents of a settings file. Those skilled in the art should appreciate that many types of rules and tests for determining whether rules are satisfied may be utilized.

A block may also include a rule 96 that is always evaluated as true, such as block 90C. By using such a rule 96, the configuration settings associated with the block are always included in the settings file. Additionally, a block may include a rule that is always false. Such a rule may be useful for blocks that are only intended to be included from other blocks. Moreover, the global configuration file 64 may contain a required settings parameter 92. The required settings parameter 92 identifies one or more configuration settings that must be included in the settings file in order for the Web server computer to configure itself correctly. As will be described below with respect to FIG. 6, an error message may be generated at the Web server computer if the configuration settings identified by the required settings parameter 92 are not present in the settings file.

The list of settings associated with a first block may also include the name of a second block. When the block is evaluated as true, the configuration settings associated with the second block are then included in the settings file along with any configuration settings associated with the first block. In this manner, many different blocks may trigger a group of configuration settings without explicitly stating them with each block.

Referring now to FIG. 3B, a data structure for an illustrative settings file 66 utilized in an embodiment of the present invention will be described. The settings file 66 comprises one or more configuration settings 98A–98N. As described above, configuration settings 98A–98N comprise a setting name and a corresponding value that corresponds to an actual configuration parameter within the Web server computer. As will be described in greater detail below, the configuration settings 98A–98N are added to the configuration file 64 dynamically as the global configuration file 64 is parsed. When the Web server computer has completed its parse of the global configuration file 64, the configuration settings 98A–98N identified in the settings file 66 are used to configure the Web server computer.

Figure 4:
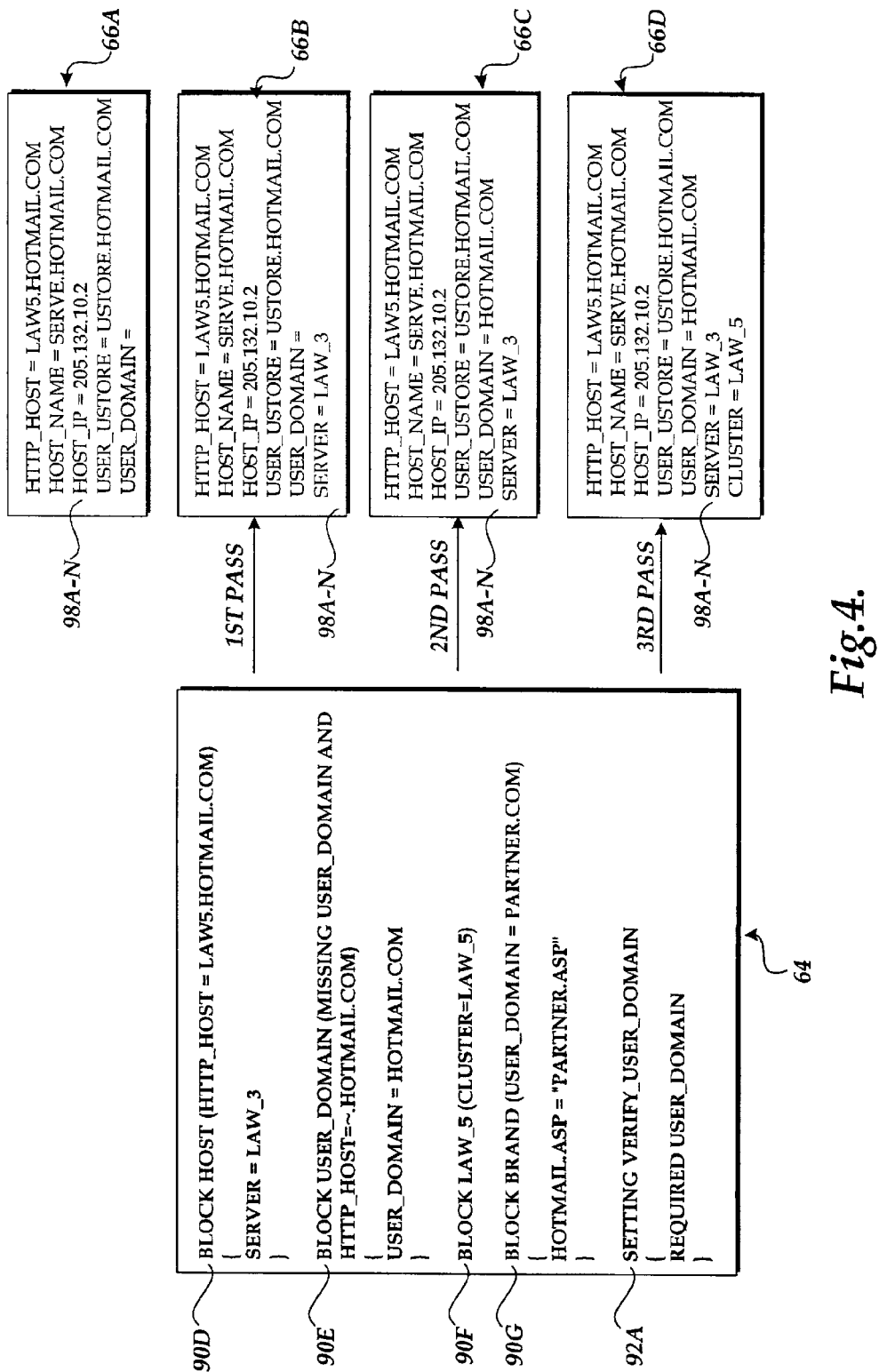
FIG. 4 is a block diagram illustrating the creation of a settings file based upon information contained in a global configuration file according to an actual embodiment of the present invention.

Referring now to FIG. 4, aspects of the present invention will be described in the context of an illustrative global configuration file 64 utilized to create a settings file 66D for configuring a Web server computer. The creation of the settings file and configuration of the Web server computer occurs in response to a request received at the Web server computer. In response to the request, the Web server computer 8 parses the global configuration file 64 and creates a settings file 66D. The settings file 66D is then used to configure the Web server computer 8.

Prior to beginning the parse of the global configuration file 64, the Web server computer adds one or more configuration settings to the settings file 66A. According to an embodiment of the present invention, these configuration settings are determined based upon information provided with the request, or from information maintained in a registry of the Web server computer. So, for instance, the settings file 66A may contain configuration settings 98A–98N prior to the parse of the global configuration file 64. Configuration settings may include HTTP_HOST, HOST_NAME, HOST_IP, and USER_USTORE configuration settings 98A–98N and their associated values.

In order to parse the global configuration file 64, the Web server computer 8 tests rules associated with each block in the global configuration file 64 to determine if they are satisfied. The rules are tested using the current contents of the settings file 66A–66N. If a rule is satisfied or triggered, the configuration settings associated with the block are added to the settings file 66A–66N and all of the untriggered rules in the configuration file 64 are again tested with the new contents of the settings file, the next rule is tested. So, for instance, the rule associated with the block "HOST" 90D comprises "HTTP_HOST=LAW5.HOTMAIL.COM." Therefore, for the rule to be satisfied, the configuration parameter "HTTP_HOST" must be set to "LAW5. HOTMAIL.COM" in the settings file 66A. Because the HTTP_HOST parameter is set to "LAW5.HOTMAIL.COM" in the settings file 66, the rule is satisfied. Accordingly, the configuration setting associated with the block "HOST" 90D is added to the settings file 66A to create the settings file 66B. The rule associated with the block "USER_DOMAIN" 90E is then tested using the new settings file 66B.

The rule "MISSING USER_DOMAIN AND HTTP_HOST=~.HOTMAIL.COM" is associated with the block "USER_DOMAIN" 90E. The "MISSING" command indicates that the element is true if the parameter is undefined. The "~" character is utilized as a wildcard placeholder. Therefore, this rule is also satisfied because the settings file 66B indicates that the USER_DOMAIN configuration setting is undefined and that the HTTP_HOST configuration parameter is set to "LAW5. HOTMAIL.COM." Accordingly, the configuration parameters associated with the block "USER_DOMAIN" 90E are added to the settings file 66B to create the new settings file 66C. The subsequent blocks "LAW_5" 90F and "BRAND" 90G are tested in a similar fashion to create the settings file 66D.

The global configuration file 64 may also contain a required configuration setting 92A. When the Web server computer 8 has completed its parse of the blocks in the global configuration file 64 having rules, it determines if any required configuration settings 92A have been specified. If required configuration settings 92A have been specified, the Web server computer 8 determines whether the required configuration settings 92A are contained in the settings file 66D. If the required configuration settings 92A are not contained in the settings file 66D, the Web server computer 8 generates an error message. If the required configuration settings 92A are contained in the settings file 66D, the Web server computer 8 utilizes the contents of the settings file 66D to configure itself. In the global configuration file 64 shown in FIG. 4, the configuration setting "USER_DOMAIN" has been specified as a required configuration setting 92A. Because the settings file contains a USER_DOMAIN configuration setting, the settings file 66D is valid and may be utilized by the Web server computer 8 to configure itself.

Figure 5:
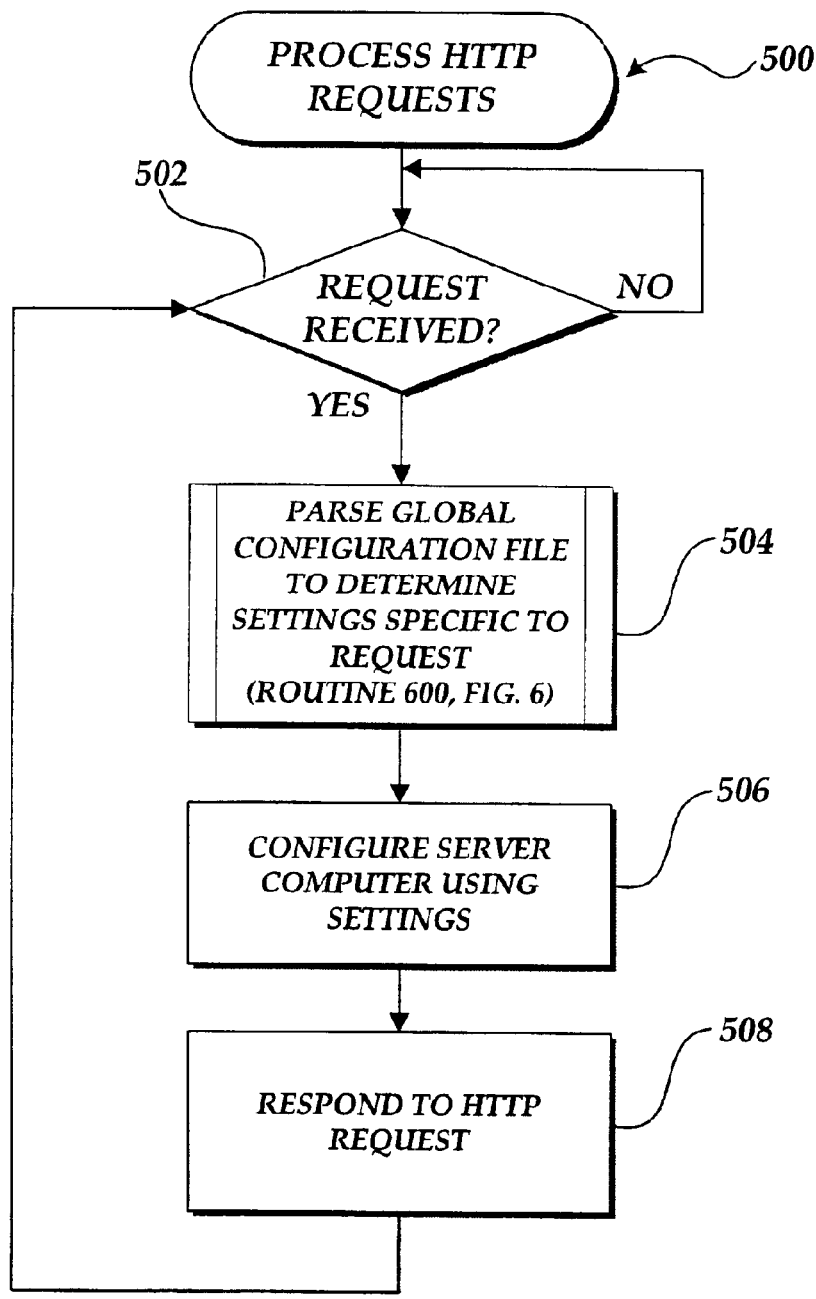
FIG. 5 is a flow diagram illustrating a routine for processing server requests according to an actual embodiment of the present invention.

Referring now to FIG. 5, an illustrative Routine 500 will be described for processing requests received at a server computer embodying aspects of the present invention. Routine 500 begins at block 502, where a determination is made as to whether a request has been received at a Web server computer. According to an embodiment of the present invention, the request comprises an HTTP request message for a resource located at, or available to, the Web server computer. For instance, the request may comprise an HTTP request message for a Web page located at the Web server computer 8. If such a request has not been received, the Routine 500 branches back to block 502, where another similar determination is made.

If, at block 502, it is determined that a request has been received at the Web server computer 8, the Routine 500 continues to block 504, where the Web server computer 8 parses a global configuration file 64 to identify configuration settings specific to the request. As will be described in more detail below, the configuration file 64 is iteratively parsed until no rules can be evaluated as true using the contents of the settings file. The contents of the settings file is then considered "final," and is utilized to configure the Web server computer 8. An illustrative routine for parsing the global configuration file 64 is described below with reference to FIG. 6.

From block 504, the Routine 500 continues to block 506, where the Web server computer 8 is configured using the configuration settings that are identified as specific to the request. The Routine 500 then continues to block 508, where the Web server computer 8 responds to the request. From block 508, the Routine 500 continues to block 502, where the Web server computer 8 again determines if a request has been received for a resource located at, or available to, the Web server computer 8. In this manner, the Web server computer 8 dynamically configures itself each time a request is received.

Figure 6:
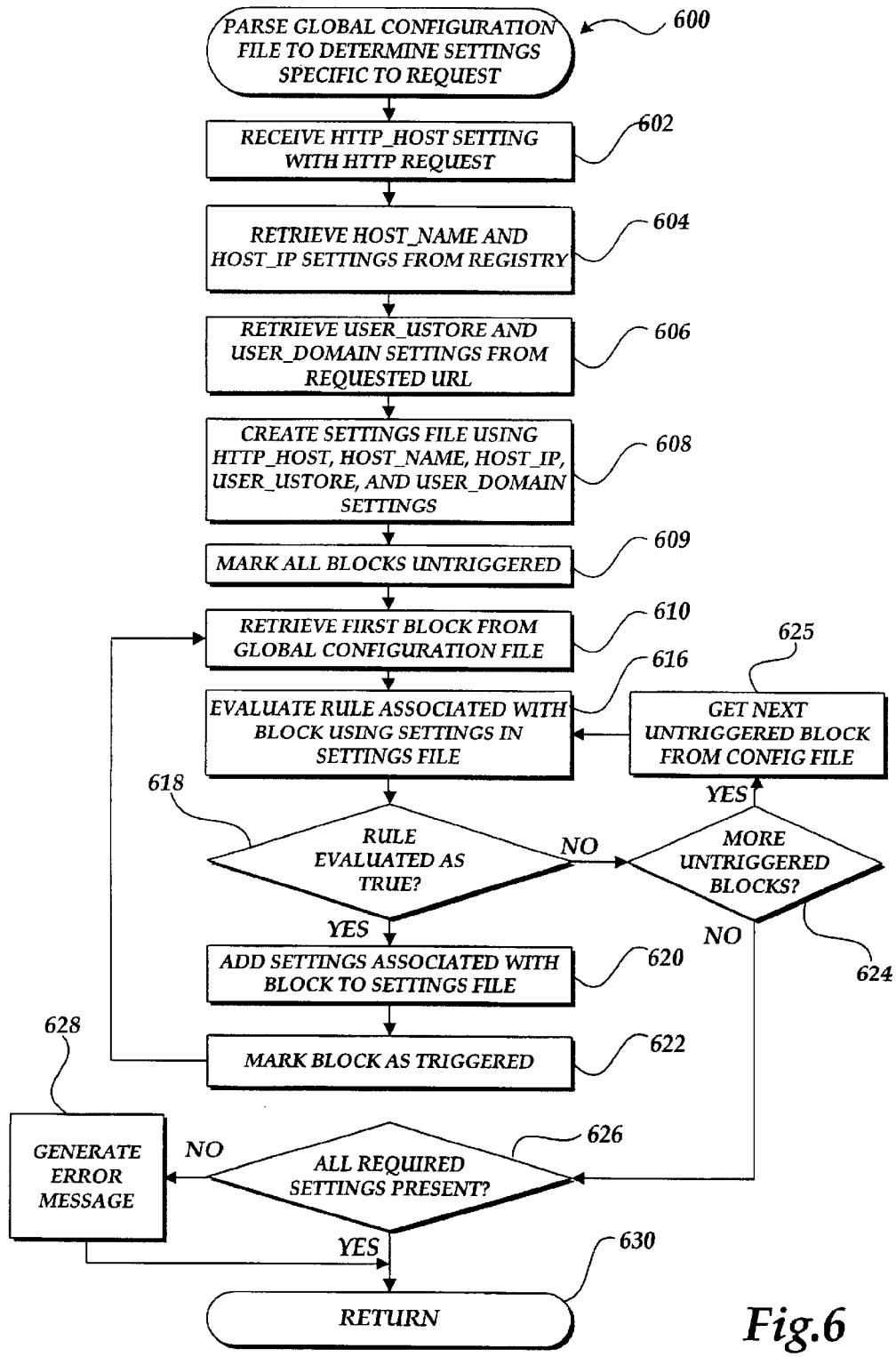
FIG. 6 is a flow diagram illustrating a routine for dynamically configuring a server computer according to an actual embodiment of the present invention.

Referring now to FIG. 6, an illustrative Routine 600 will be described for parsing a global configuration file 64 to determine configuration settings specific to a particular request. Routine 600 begins at block 602, where an "HTTP_HOST" configuration setting is identified. According to an embodiment of the present invention, the HTTP_HOST configuration setting is received as part of the request and identifies the name of the particular host computer to which the request is directed. From block 602, the Routine 600 continues to block 604, where "HOST_NAME" and "HOST_IP" configuration settings are retrieved from a location accessible to the operating system of the Web server computer 8. For instance, the HOST_NAME and HOST_IP configuration settings may be retrieved from a registry maintained at the Web server computer 8. The HOST_NAME configuration setting specifies the server name for the Web server computer 8. The HOST_IP configuration setting specifies the Internet Protocol address for the Web server computer 8.

From block 604, the Routine 600 continues to block 606, where "USER_USTORE" and "USER_DOMAIN" configuration settings. The USER_USTORE configuration setting identifies a location that stores information corresponding to the user of a client computer making the request. For instance, the USER_USTORE configuration setting may identify the location of a particular database that maintains configuration information specific to the user. The USER_DOMAIN configuration setting identifies the domain to which the request is directed. According to an embodiment of the present invention, the USER_USTORE and USER_DOMAIN configuration settings are passed to the Web server computer 8 as a portion of the requested URL. Those skilled in the art should appreciate that the USER_USTORE and USER_DOMAIN settings may be stored on the client computer making the request and passed to the Web server computer 8 using a persistent client object, or cookie, or other method known to those skilled in the art.

From block 606, the Routine 600 continues to block 608, where the HTTP_HOST, HOST_NAME, HOST_IP, USER_DOMAIN, and USER_USTORE configuration settings are stored in a settings file. As described above with respect to FIG. 3B, the settings file comprises a list of the configuration settings and their associated configuration values. Those skilled in the art should appreciate that these configuration settings are illustrative and that fewer, more, or different configuration settings may be identified and stored in the settings file prior to parsing the configuration file 64.

From block 608, the Routine 600 continues to block 609, where all blocks in the configuration file 64 are marked as untriggered. The Routine 600 then continues to block 610, where a first block is retrieved from the global configuration file 64. As described above with respect to FIG. 3A, the global configuration file 64 contains one or more blocks. Each block may contain a rule that, if evaluated as true, will cause configuration settings contained in the block to be added to the settings file. Additionally, the global configuration file 64 may contain one or more required configuration parameters that must be included in the settings file when the global configuration file 64 has been completely parsed.

From block 610, the Routine 600 continues to block 616. At block 616, the rule associated with the current block is evaluated using the configuration settings contained in the settings file. The Routine 600 then continues from block 616, to block 618, where a determination is made as to whether the rule was evaluated as true. As described above with respect to FIG. 3A, a rule comprises a Boolean expression that may be evaluated as true or false using the configuration settings contained in the settings file. If the rule is evaluated as false, the Routine 600 branches from block 618 to block 624. If the rule is evaluated as true, the Routine 600 continues from block 618 to block 620, where the configuration settings associated with the rule are added to the settings file. The Routine 600 then continues from block 620 to block 622 where a flag is set indicating that the current block has been triggered. From block 622, the Routine 600 returns to block 622, where the first block in the configuration file 64 is again received.

If at block 618, the rule is evaluated as false, the Routine 600 branches to block 624, where the Web server computer 8 makes a determination as to whether any additional untriggered blocks remain in the global configuration file 64. If more untriggered blocks remain, the Routine 600 branches from block 624 to block 625, where the next untriggered block is retrieved from the global configuration file 64 as the current block. The Routine 600 then continues to block 616, where the block is parsed as described above.

If, at block 624, it is determined that no untriggered blocks remain in the global configuration file 64, the Routine 600 branches to block 626. At block 626, the Web server computer 8 determines whether particular configuration settings are required in the settings file and, if so, whether the required configuration settings are present. If the Web server computer 8 determines that the required configuration settings are not present, the Routine 600 branches to block 628, where an error message is generated at the Web server computer 8. An error message may also be generated at the client computer that initiated the request. If, at block 626, the Web server computer 8 determines that all of the required configuration settings are present in the settings file, the Routine 600 continues to block 630, where it ends.

As described briefly above, the present invention also provides an executable software component for verifying the contents of the global configuration file 64. The software component is executed on the Web server computer 8, or other computer, and is operative to identify problems within the global configuration file 64, such as syntax errors, conflicting settings, related settings that are set inconsistently, or other errors. Aspects of the present invention for verifying the global configuration file 64 are described below with respect to FIGS. 7–10.

Figure 7:
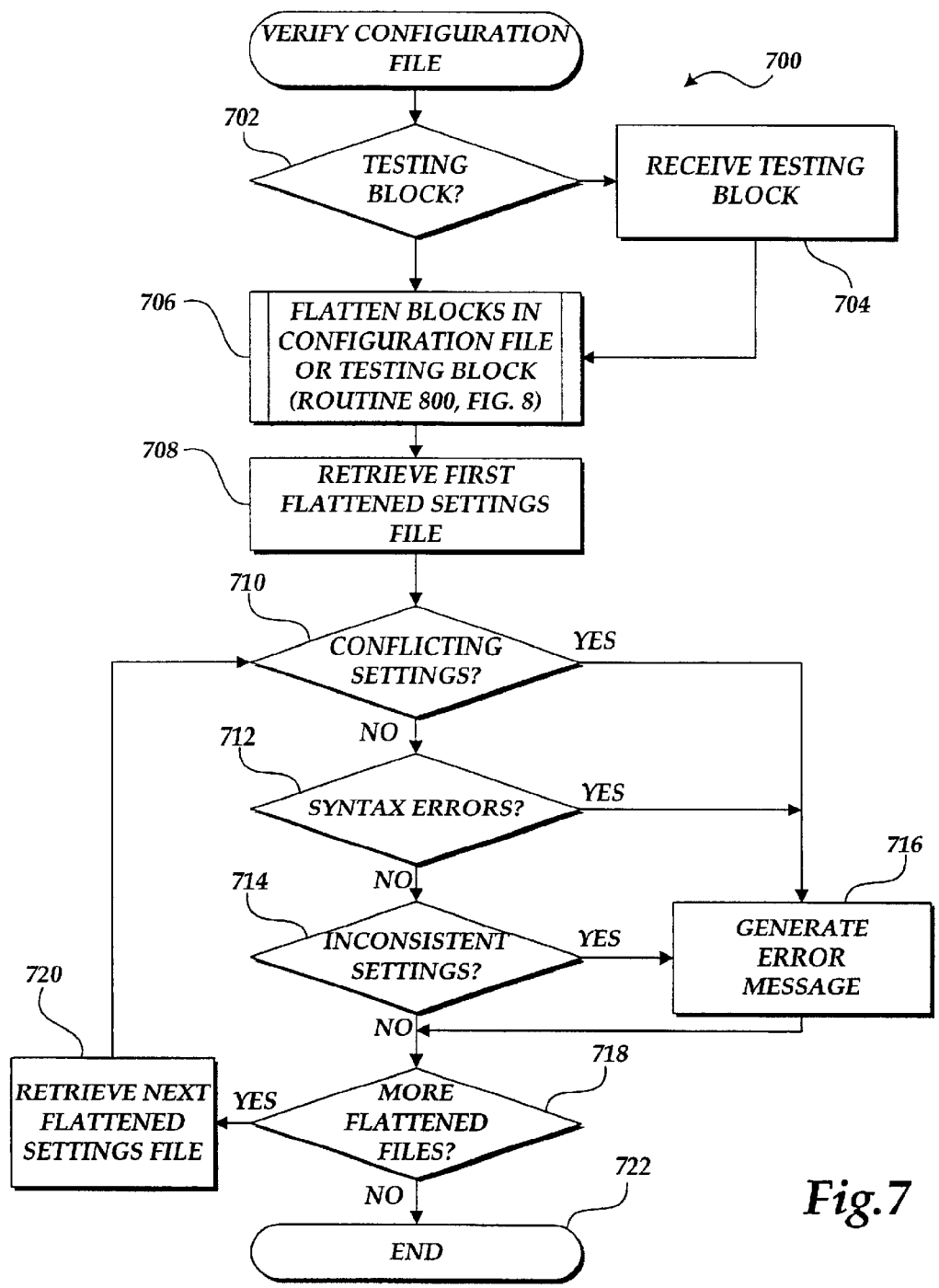
FIG. 7 is a flow diagram illustrating a routine for verifying the contents of a configuration file according to an embodiment of the present invention.

Referring now to FIG. 7, an illustrative Routine 700 will be described for verifying the contents of the global configuration file 64. The Routine 700 begins at block 702, where a determination is made as to whether a testing block should be received. A testing block may be provided by a user or from another source. A settings file may then be generated from the testing block and verified. If, at block 702, it is determined that a testing block is not to be received, the Routine 700 continues from block 702 to block 706. If a testing block is to be received, the Routine 700 branches to block 704, where the testing block is received. The Routine then continues from block 704 to block 706.

At block 706, the blocks in the configuration file 64 are "flattened." Flattening a block comprises identifying the settings that will be triggered if the rules associated with the block are set to true and the configuration file 64 is parsed. If a testing block has been provided, the testing block may similarly be "flattened." The output of the flattening processes is a flattened settings file corresponding to each block. The flattened settings file contains the list of settings that would be generated if the rules associated with the block were set to true and the configuration file was parsed as described above with respect to FIG. 6. An illustrative routine for flattening block in the configuration file or a testing block is described below with reference to FIG. 8.

From block 706, the Routine 700 continues to block 708, where the first flattened settings file is retrieved. The Routine 700 then continues to block 710, where a determination is made as to whether the flattened settings file contains and settings that are conflicting. If there are conflicting settings in the flattened settings file, the Routine 700 branches to block 716, where an error message is generated identifying the conflicting settings. If there are no conflicting settings, the Routine 700 continues to block 712, where a determination is made as to whether there are syntax errors in the flattened settings file. If the flattened settings file contains syntax errors, the Routine 700 branches to block 716, where an error message is generated identifying the syntax errors.

If the flattened settings file does not contain syntax errors, the Routine 700 continues to block 714, where a determination is made as to whether the flattened settings file contains related settings that are set inconsistently. If the flattened settings file contains inconsistently set related settings, the Routine 700 branches to block 716, where an error message is generated identifying the inconsistently set related settings. If the flattened settings file does not contain inconsistently set related settings, the Routine 700 continues to block 718.

At block 718, a determination is made as to whether there are additional flattened settings files to be verified. If there are additional flattened settings files to be verified, the Routine 700 branches to block 720, where the next flattened settings file is retrieved. The Routine 700 then returns to block 710, where the block is verified as described above. If, at block 718, it is determined that there are no additional flattened settings files to verify, the Routine 700 continues to block 722, where it ends.

Figure 8:
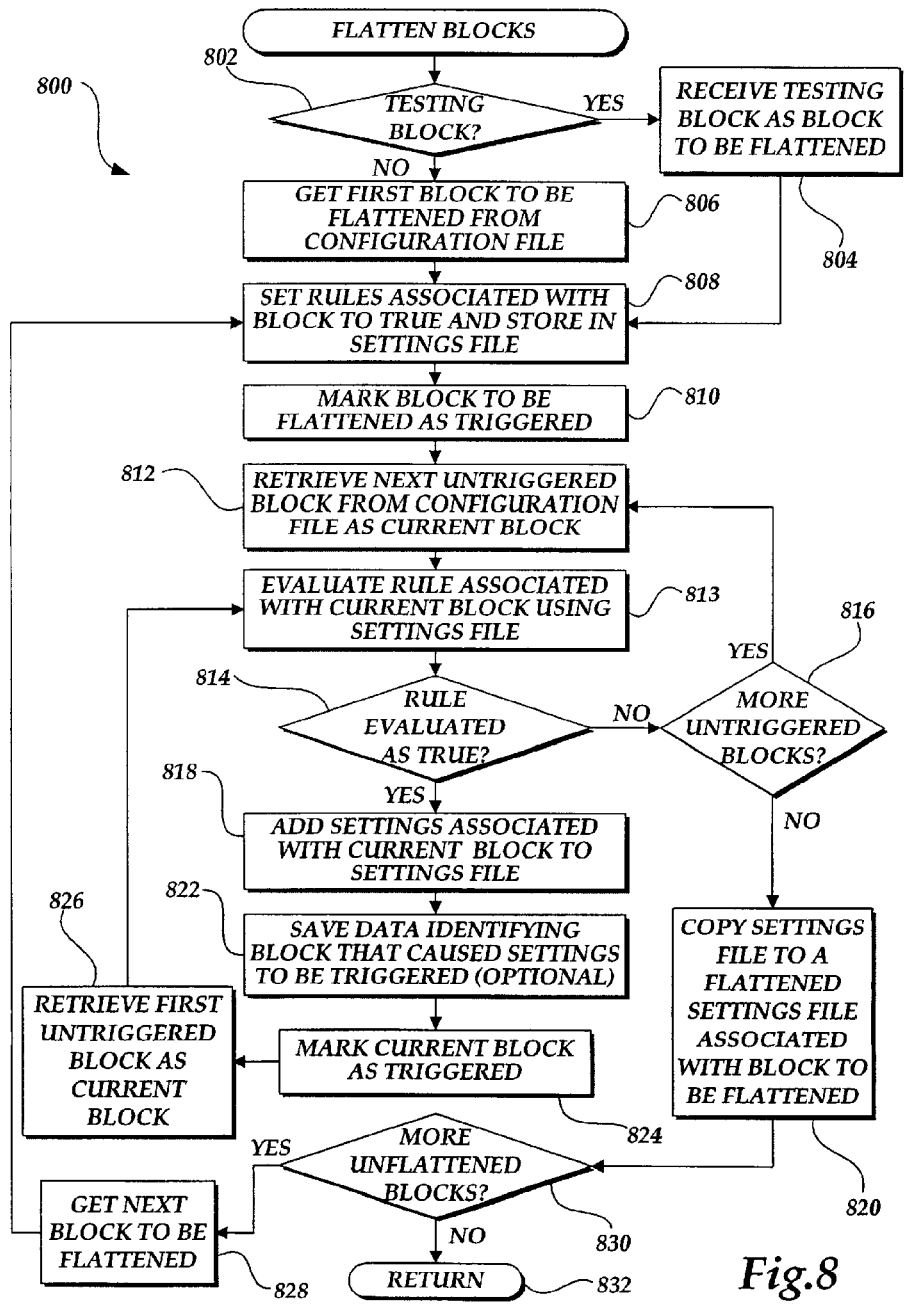
FIG. 8 is a flow diagram illustrating a routine for flattening blocks in a configuration file according to an actual embodiment of the present invention.

Turning now to FIG. 8, an illustrative Routine 800 will be described for flattening a global configuration file 64. The Routine 800 begins at block 802 where a determination is made as to whether a testing block is to be flattened. If a testing block is to be flattened, the Routine 800 branches to block 804, where the testing block is received as the block to be flattened. The Routine 800 then continues from block 804, to block 808.

If, at block 802, it is determined that a testing block is not to be flattened, the Routine 800 continues to block 806. At block 806, a first block to be flattened is retrieved from the global configuration file 64. The Routine 800 then continues from block 806 to block 808, where the rules associated with the block to be flattened are set to "true," or satisfied, and stored in the settings file. From block 808, the Routine 800 continues to block 810 where the block to be flattened is marked as having been triggered.

From block 810, the Routine 800 continues to block 812, where the next untriggered block is retrieved from the global configuration file 64 as the current block. The Routine 800 then continues to block 813, where the rule associated with the current block is evaluated using the contents of the settings file. From block 813, the Routine 800 continues to block 814, where a determination is made as to whether the rule associated with the current block was evaluated as true. If the rule was not evaluated as true, the Routine 800 branches to block 816, where a determination is made as to whether additional untriggered blocks remain in the configuration file. If additional untriggered blocks remain, the Routine 800 returns from block 816 to block 812, where the next untriggered block is retrieved as the current block and tested with the settings file. If no additional untriggered blocks remain, the Routine 800 branches from block 816 to block 820, where the settings file is copied to a flattened settings file associated with the block that is being flattened. The Routine 800 then continues from block 820 to block 832.

If, at block 814, it is determined that the rule was evaluated as true, the Routine 800 continues to block 818, where the settings associated with the current block are added to the settings file. The Routine 800 then continues from block 818 to block 822 where data identifying the current block is saved in the settings file to identify the block as having triggered the particular settings. As described briefly above, this data may take the form of a "dummy" setting within the settings file. The Routine 800 then continues to block 824 where the current block is marked as having been triggered. The Routine 800 then continues to block 826, where the first untriggered block in the global configuration file 64 is retrieved as the current block. The Routine 800 then returns to block 813 where this block is evaluated as described above.

From block 820, the Routine 800 continues to block 830, where a determination is made as to whether additional unflattened blocks exist within the global configuration file 64. If additional blocks remain to be flattened, the Routine 800 branches to block 828, where the next block to be flattened is retrieved from the global configuration file. The Routine 800 then continues from block 828 to block 808, where the next block to be flattened is processed as described above. If, at block 830, it is determined that there are no additional blocks to be flattened, the Routine 800 branches to block 832, where it returns.

Figure 9:
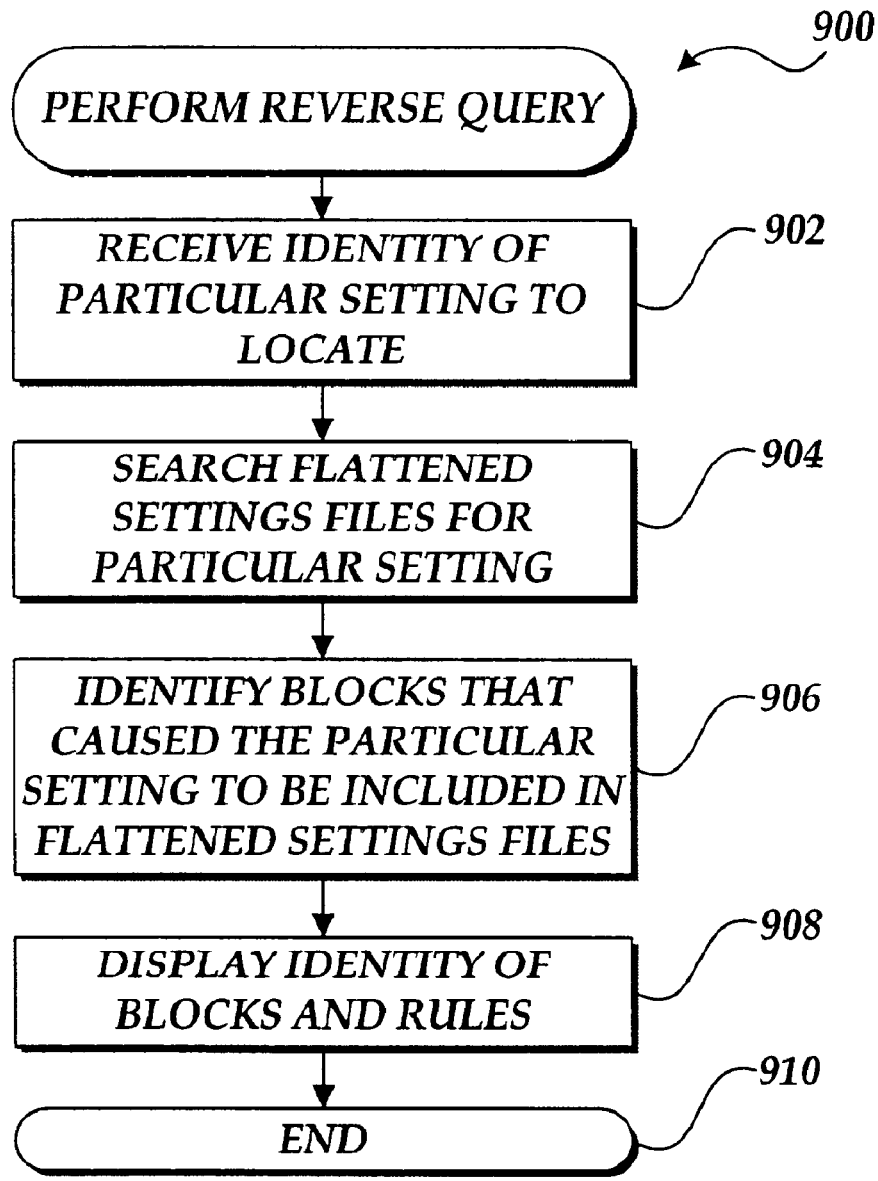
FIG. 9 is a flow diagram illustrating a routine for performing a reverse query according to an actual embodiment of the present invention.

Referring now to FIG. 9, an illustrative Routine 900 will be described for performing reverse queries on the flattened settings files. As described briefly above, reverse queries allow the blocks that generated particular settings in the flattened settings file to be identified. The Routine 900 begins at block 902, where the identity of the particular setting to located is received. The Routine 900 then continues to block 904, where the flattened settings files are searched for the particular setting. From block 904, the Routine 900 continues to block 906, where the blocks that caused the particular setting to be included in the flattened settings file are identified. As described above with respect to FIG. 8, dummy settings may be written to the flattened settings files during the flattening process that identify a particular block that caused as setting to be included. These dummy settings may be utilized to identify the blocks that caused the particular setting to be included in the flattened settings file. From block 906, the Routine 900 continues to block 908, where the identity of the blocks that caused the particular setting to be included in the flattened settings file are displayed. The Routine 900 then continues to block 910, where it ends.

Figure 10:
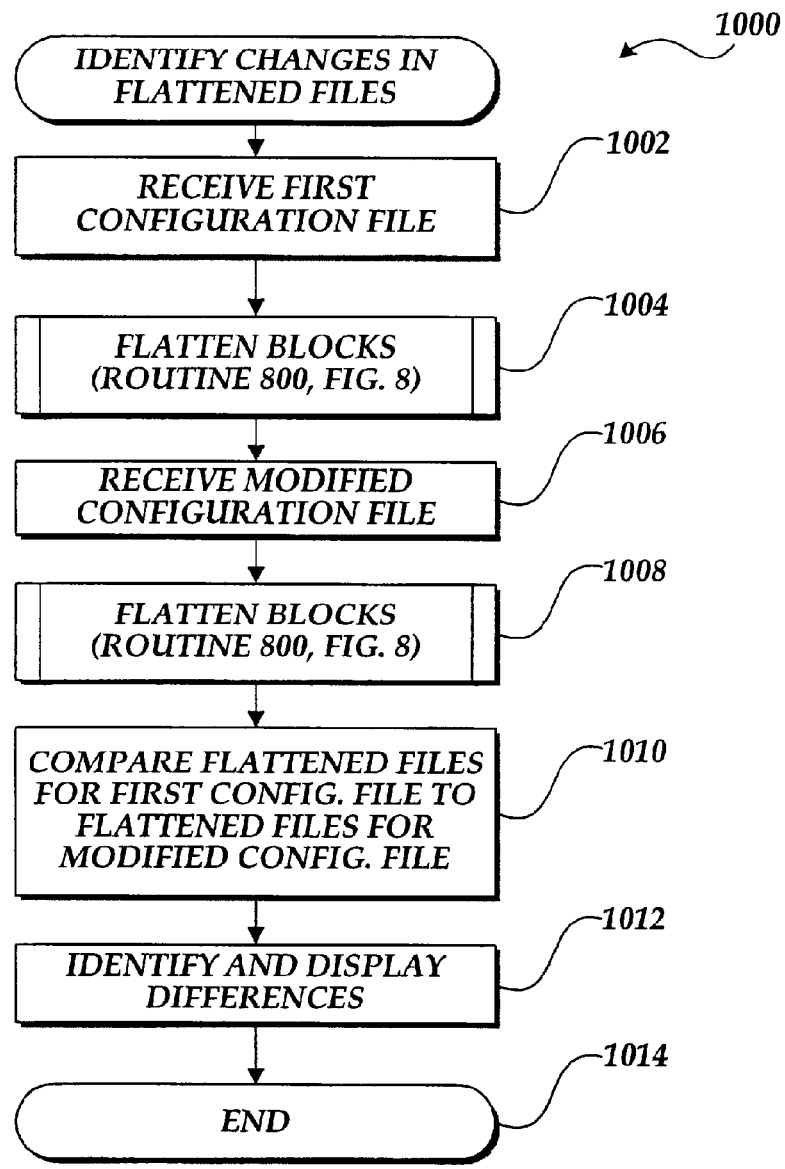
FIG. 10 is a flow diagram illustrating a routine for identifying changes in flattened files caused by changes to a configuration file according to an actual embodiment of the present invention.

Referring now to FIG. 10, an illustrative Routine 1000 for identifying changes in the flattened settings file will be described. As discussed briefly above, the Routine 1000 is operative to identify the changes in the flattened settings file cause by changes in the global configuration file 64. The Routine 1000 begins at block 1002, where a first global configuration file is received. The Routine 1000 then continues to block 1004, where the blocks of the first configuration file are flattened as described above with respect to FIG. 8. This process creates a first set of flattened settings files.

From block 1006, the Routine 1000 continues to block 1006, where a modified global configuration file is received. The Routine 1000 then continues to block 1008, where the blocks of the modified configuration file are flattened as described above with respect to FIG. 8. This process creates a second set of flattened settings files. At block 1010, the flattened settings files corresponding to the first global configuration file are compared to the flattened settings files corresponding to the modified global configuration file, and any differences between the two sets of flattened settings files are identified. The Routine 1000 then continues to block 1012, where the identified differences are stored or displayed. The Routine 1000 then continues from block 1012 to block 1014, where it ends.

As described briefly above, the flattened settings files can be used to dynamically configure the server computer in an embodiment of the invention. In order to utilize the flattened settings files to configure the server computer, a new initial settings file is created. The new initial settings file further simplifies the configuration process by including settings from flattened blocks that would be triggered by configuration settings that do not change.

Figure 11:
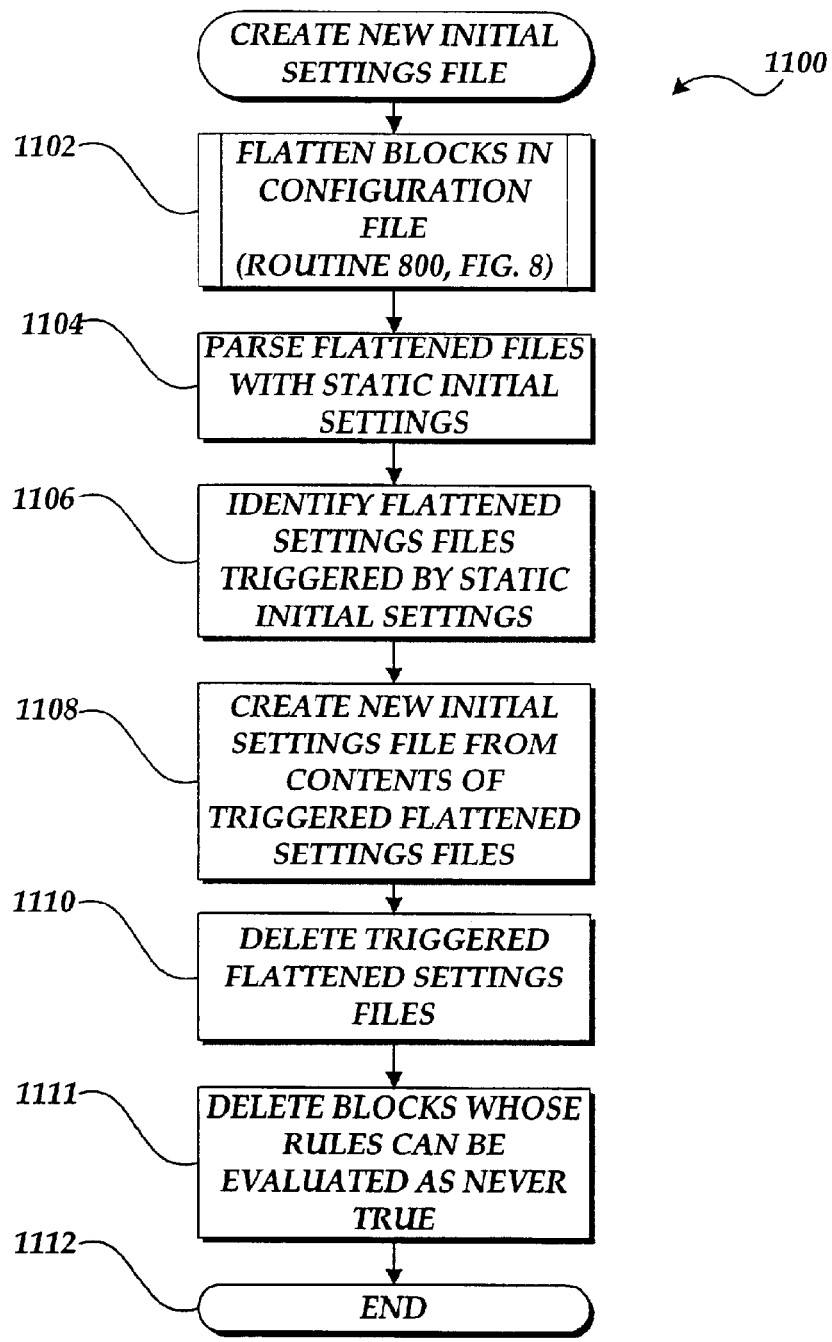
FIG. 11 is a flow diagram illustrating a routine for creating a new initial settings file using flattened settings files in an actual embodiment of the present invention.

Referring now to FIG. 11, a routine for generating a new initial settings file will be described. The Routine 1100 begins at block 1102, where the blocks in the global configuration file are flattened. An illustrative Routine 800 for flattening the blocks of the global configuration file was described above with respect to FIG. 8. The Routine 1100 continues from block 1102 to block 1104, where the flattened settings files are parsed with any non-changing, or static, settings to determine if any of the static settings would cause any of the flattened settings files to trigger. The Routine 1100 then continues to block 1106, where any flattened settings files that would be triggered by the static initial settings are identified. The Routine 1100 then continues to block 1108, where a new initial settings file is created comprising the contents of the triggered flattened settings files and the static initial settings. From block 1108, the Routine 1100 continues to block 1110, where the triggered flattened settings files are deleted. These files are non longer needed because their contents have been included in the new initial settings file. Similarly, at block 1111, blocks whose rules can be evaluated as never true may also be deleted. The Routine 1100 then continues to block 1112, where it ends.

Figure 12:
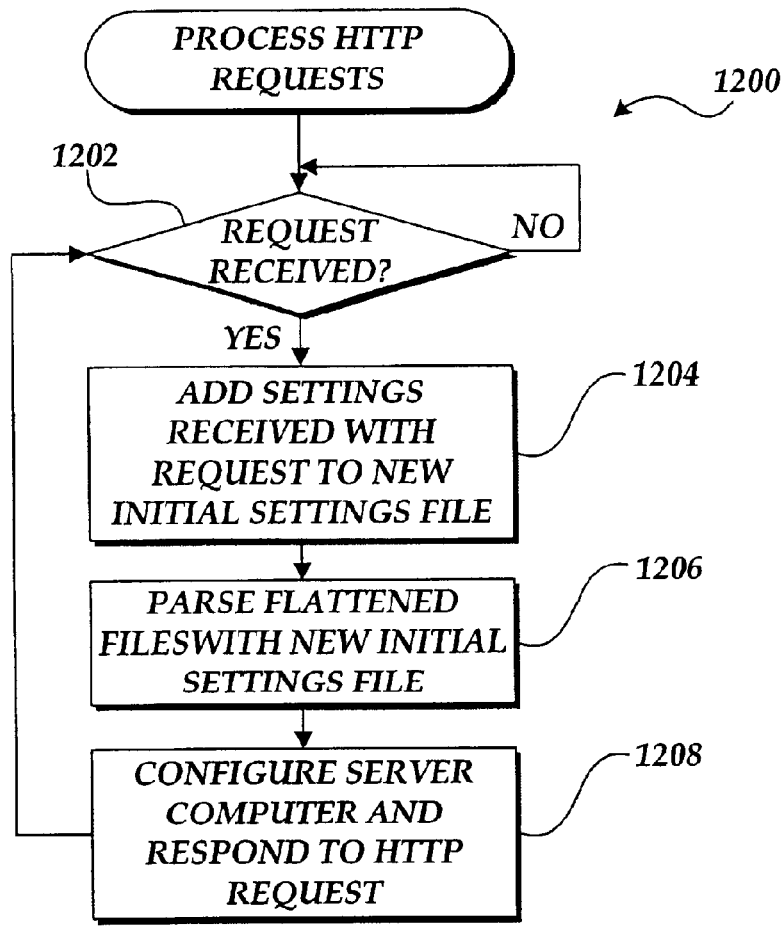
FIG. 12 is a flow diagram illustrating a routine for processing HTTP requests and configuring a server computer using flattened settings files according to an actual embodiment of the present invention.

Once the new initial settings file has been created, the Web server computer 8 can be dynamically configured using the new initial settings file and the remaining flattened settings files. Turning now to FIG. 12, an illustrative Routine 1200 for configuring the server computer in this manner will be described. The Routine 1200 begins at block 1202, where a determination is made as to whether a request has been received for a resource available via the server computer. If such a request has not been received, the Routine 1200 branches back to block 1202, where another such determination is made.

If, at block 1202, it is determined that a request has been received, the Routine 1200 continues to block 1204, where any settings received with the request, such as the "HTTP_HOST" setting described above, are added to the new initial settings file. The Routine 1200 then continues to block 1206, where the remaining flattened settings files are parsed with the new initial settings file. The settings from any triggered flattened settings files are added to the new initial settings file. Because the settings files have been flattened, they only need to be parsed once. The Routine 1200 then continues to block 1208, where the server computer is configured using the initial settings file. The server computer can then respond to the request. The Routine 1200 then returns to block 1202 where additional requests can be processed in a similar manner.

In light of the above, it should be appreciated by those skilled in the art that the present invention provides a method and apparatus for verifying the contents of a global configuration file. While an actual embodiment of the invention has been illustrated and described, it will be appreciated that various changes can be made therein without departing from the spirit and scope of the invention.

The embodiments of the invention in which an exclusive property or privilege is claimed are defined as follows:

1. A method for verifying a configuration file having one or more blocks containing configuration rules and associated configuring settings, comprising:

flattening one of said blocks to create flattened settings associated with said block; and verifying said flattened settings.

2. The method of claim 1, further comprising:

determining whether additional blocks remain in said configuration file to be verified; and in response to determining that additional blocks remain to be verified, flattening and verifying said additional blocks.

3. The method of claim 1, wherein verifying said flattened settings comprises determining whether a setting conflicts with another setting within said flattened settings.

4. The method of claim 1, wherein said one of said blocks comprises a testing block.

5. The method of claim 3, wherein verifying further comprises determining whether any syntax errors exist within said flattened settings.

6. The method of claim 5, wherein verifying further comprises determining whether a setting is set inconsistently with a related setting.

7. The method of claim 6, wherein flattening one of said blocks comprises:

setting said configuration rules associated with said one of said blocks as satisfied;

adding said configuration settings associated with said one of said blocks to said flattened settings;

evaluating a next one of said blocks using said flattened settings to determine whether a configuration rule associated with said next one of said blocks is satisfied; and in response to determining that said configuration rule is satisfied, adding said configuration settings associated with said next one of said blocks to said flattened settings.

8. The method of claim 7, wherein flattening one of said blocks further comprises:

determining whether an additional block in said configuration file remains to be tested; and in response to determining that an additional block remains to be tested, evaluating a configuration rule associated with said additional block with said flattened settings to determine if said additional configuration rule is satisfied, and in response to determining that said additional configuration rule is satisfied, adding one or more configuration settings associated with said additional block to said flattened settings.

9. The method of claim 8, further comprising:

in response to determining that no additional block remains to be tested in said configuration file, saving said flattened settings in a data file associated with said one of said blocks.

10. A method for verifying a configuration file having one or more blocks containing configuration rules and associated configuring settings, comprising:

flattening each of said blocks to create flattened settings associated with each of said blocks; and saving data with each of said blocks identifying each of the blocks whose rules were satisfied to created said flattened settings.

11. The method of claim 10, wherein saving said flattened data further comprises saving data identifying a block whose rule was satisfied to generate a particular setting contained in said flattened settings.

12. The method of claim 11, further comprising:

receiving the identity of a particular setting;

searching said flattened settings for said particular setting; and based on said saved data, identifying one or more blocks that caused said particular setting to be included in said flattened settings.

13. A method for verifying a configuration file having one or more blocks containing configuration rules and associated configuring settings, comprising:

generating one or more flattened settings files for said configuration file;

receiving a modified configuration file;

generating one or more flattened settings files for said modified configuration file;

comparing said flattened settings files for said configuration file to said flattened settings files for said modified configuration file; and based on said comparison, identifying any differences between said flattened settings files for said configuration file and said flattened settings files for said modified configuration file.

14. A method for dynamically configuring a server computer, comprising:

generating one or more flattened settings files for a configuration file;

parsing said flattened settings files with one or more static initial settings to identify the flattened settings files that are triggered by said initial settings;

adding configuration settings associated with said triggered flattened settings files to said initial settings to create a new initial settings file; and deleting said triggered flattened settings files.

15. The method of claim 14, further comprising:

receiving a request for a resource located at said server computer;

in response to said request, identifying one or more configuration settings based upon said request;

parsing said flattened settings files with said configuration settings and said new initial settings file to create new configuration settings; and configuring said server computer based upon said new configuration settings.

16. Computer-readable medium containing instructions that, when executed by a computer, cause the computer to verify a configuration file having one or more blocks containing configuration rules and associated configuring settings by:

flattening one of said blocks to create flattened settings associated with said block; and verifying said flattened settings.

17. The computer-readable medium of claim 16, wherein said instructions also cause said computer to verify a configuration file by:

determining whether additional blocks remain in said configuration file to be verified; and in response to determining that additional blocks remain to be verified, flattening and verifying said additional blocks.

18. The computer-readable medium of claim 16, wherein verifying said flattened settings comprises determining whether a setting conflicts with another setting within said flattened settings.

19. The computer-readable medium of claim 16, wherein said one of said blocks comprises a testing block.

20. The computer-readable medium of claim 18, wherein verifying said flattened settings further comprises determining whether any syntax errors exist within said flattened settings.

21. The computer-readable medium of claim 20, wherein verifying said flattened settings further comprises determining whether a setting is set inconsistently with a related setting.

22. The computer-readable medium of claim 21, wherein flattening one of said blocks comprises:

setting said configuration rules associated with said one of said blocks as satisfied;

adding said configuration settings associated with said one of said blocks to said flattened settings;

evaluating a next one of said blocks using said flattened settings to determine whether a configuration rule associated with said next one of said blocks is satisfied; and in response to determining that said configuration rule is satisfied, adding said configuration settings associated with said next one of said blocks to said flattened settings.

23. The computer-readable medium of claim 22, wherein flattening one of said blocks further comprises:

determining whether an additional block in said configuration file remains to be tested; and in response to determining that an additional block remains to be tested, evaluating a configuration rule associated with said additional block with said flattened settings to determine if said additional configuration rule is satisfied, and in response to determining that said additional configuration rule is satisfied, adding one or more configuration settings associated with said additional block to said flattened settings.

24. The computer-readable medium of claim 23, further comprising:

in response to determining that no additional block remains to be tested in said configuration file, saving said flattened settings in a data file associated with said one of said blocks.

25. Computer-readable medium containing instructions that, when executed by a computer, cause the computer to verify a configuration file having one or more blocks containing configuration rules and associated configuring settings by:

flattening each of said blocks to create flattened settings associated with each of said blocks; and saving data with each of said blocks identifying each of the blocks whose rules were satisfied to created said flattened settings.

26. The computer-readable medium of claim 25, wherein saving said flattened data further comprises saving data identifying a block whose rule was satisfied to generate a particular setting contained in said flattened settings.

27. The computer-readable medium of claim 26, further comprising:

receiving the identity of a particular setting;

searching said flattened settings for said particular setting; and based on said saved data, identifying one or more blocks that caused said particular setting to be included in said flattened settings.

28. Computer-readable medium containing instructions that, when executed by a computer, cause the computer to verify a configuration file having one or more blocks containing configuration rules and associated configuring settings by:

generating one or more flattened settings files for said configuration file;

receiving a modified configuration file;

generating one or more flattened settings files for said modified configuration file;

comparing said flattened settings files for said configuration file to said flattened settings files for said modified configuration file; and based on said comparison, identifying any differences between said flattened settings files for said configuration file and said flattened settings files for said modified configuration file.

29. Computer-readable medium containing instructions that, when executed by a computer, cause the computer to dynamically configure a server computer by:

generating one or more flattened settings files for a configuration file;

parsing said flattened settings files with one or more static initial settings to identify the flattened settings files that are triggered by said initial settings;

adding configuration settings associated with said triggered flattened settings files to said initial settings to create a new initial settings file; and deleting said triggered flattened settings files.

30. The computer-readable medium of claim 29, further comprising:

receiving a request for a resource located at said server computer;

in response to said request, identifying one or more configuration settings based upon said request;

parsing said flattened settings files with said configuration settings and said new initial settings file to create new configuration settings; and configuring said server computer based upon said new configuration settings.

* * * * *